United States Patent Office 3,485,559
Patented Dec. 23, 1969

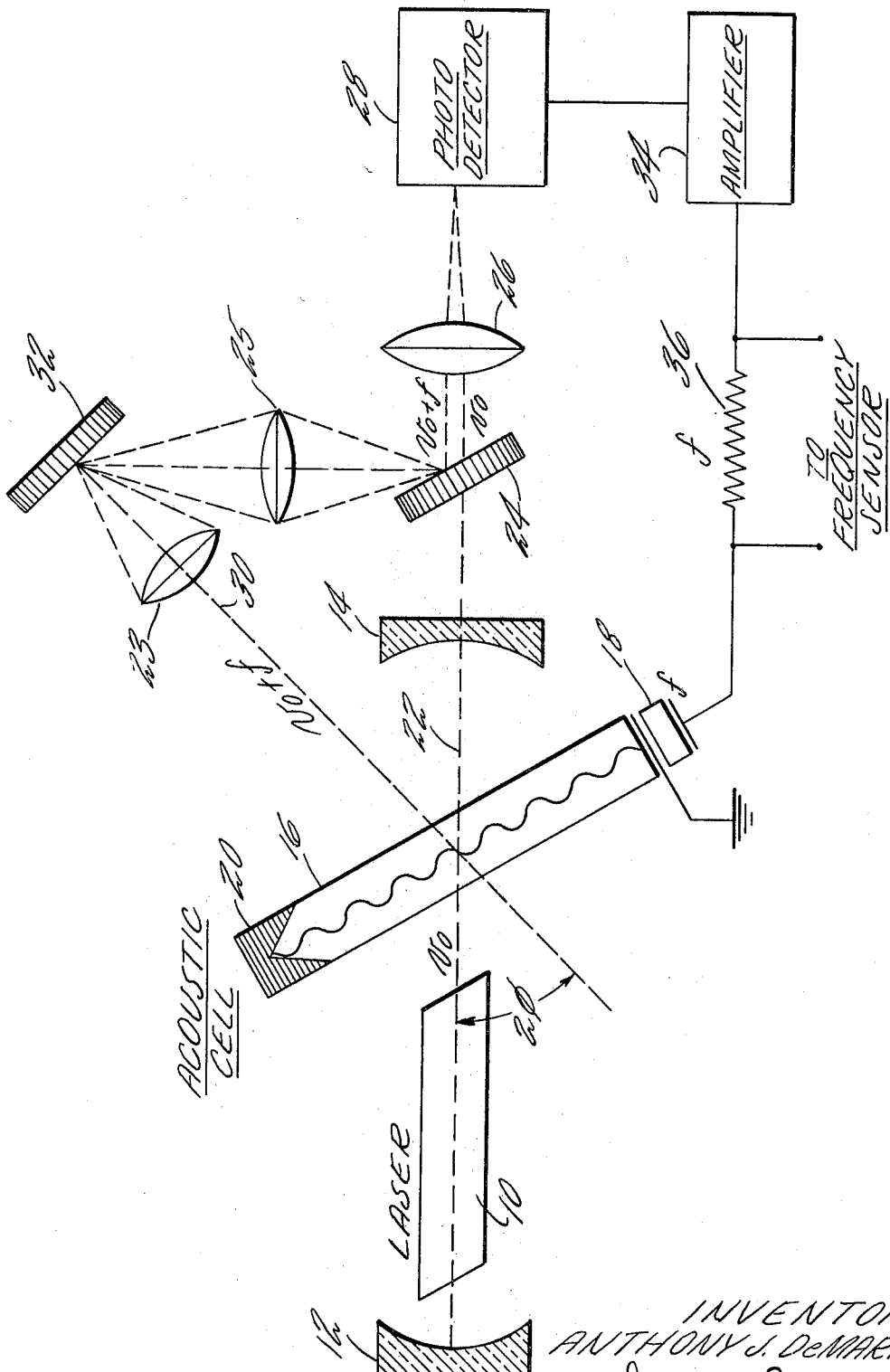

3,485,559
ANGLE MEASURING APPARATUS UTILIZING LASERS
Anthony J. DeMaria, West Hartford, Conn., assignor to United Aircraft Corporation, East Hartford, Conn., a corporation of Delaware
Filed Nov. 13, 1967, Ser. No. 682,477
Int. Cl. G01b *11/26*
U.S. Cl. 356—138       7 Claims

ABSTRACT OF THE DISCLOSURE

A laser beam is passed through an acoustic cell positioned at the Bragg angle in which is generated an ultrasonic wave, thereby diffracting the laser beam. The first order diffracted laser output is heterodyned with the zero order laser output at a photodetector, and the output of the photodetector is fed to an electronic amplifier. The output of the amplifier is made to drive the acoustic cell. The frequency of the photodetector output is directly related to the angle which the laser beam makes with the acoustic cell.

BACKGROUND OF THE INVENTION

This invention relates to measurement of angles, and particularly to extremely accurate measurement of small angular deviations by means of a feedback loop comprising an acoustic cell, a laser, a photodetector and an electronic amplifier. The frequency tuning of the acoustic wave is accomplished by optically heterodyning the first and zero order laser light scattered by the acoustic waves and feeding this signal to an amplifier driving the acoustic transducer. Since for maximum scattering the laser beam must be incident on the acoustic waves at the Bragg angle, any change of this angle will be detected by the feedback loop and the oscillation frequency of the loop will automatically change to maximize the diffraction of the laser beam. A measurement of the frequency of the loop will therefore give an extremely accurate measurement of angle.

The desirability of accurate measurement of angles is readily apparent in today's scientific culture. Many techniques and devices are commonly available which will measure angles very accurately. For example, astronomers can measure angles to accuracies of 0.01 sec. of arc, but this requires taking large numbers of photographs, and larger numbers of measurement on each photograph. R. V. Jones et al., J. Sci. Inst. 36, 90 (1959) has reported a device which can detect changes of $2 \times 10^{-5}$ sec. of arc in a time of ¼ sec.

The present invention measures angles by monitoring the frequency of an acoustically generated electrical output wave. Frequencies can be measured with an accuracy of better than one part in $10^{12}$. With reasonable temperature stability, the apparatus of this invention can measure angles to at least one part in $10^6$. Furthermore, the angle can be read simply by reading numbers from a digital frequency meter placed across the electrical output.

SUMMARY OF THE INVENTION

This invention provides its unique results by utilizing a feedback loop encompassing an acoustic cell, a laser, a photodetector and an electronic amplifier. These components are arranged in the feedback loop in such a manner that the frequency of oscillation of the loop is proportional to the angle of incidence of the laser beam on the acoustic wave.

In accordance with the invention, an acoustic cell is positioned either inside the optical feedback cavity of a continuous wave laser or outside the feedback cavity in the path of the laser beam. An ultrasonic-acoustic wave is generated within the cell by means of a piezoelectric transducer which is intimately attached to the cell, and the cell is positioned so that the acoustic wave intersects the laser beam at or near the Bragg angle of the center frequency of the bandpass of the electronic amplifier driving the acoustic cell. The laser beam is diffracted by the acoustic wave, the zero order diffracted beam propagating through the acoustic cell medium unchanged while the first order diffracted beam is Doppler shifted at a frequency equal to the acoustic wave frequency.

If the zero order and first order laser beams are beat or heterodyned together, as for example by focusing both beams at the input of a photodetector, an output signal having the frequency of the acoustic wave is produced. The output of the photodetector is amplified by an electronic amplifier and fed back to actuate the acoustic transducer.

Oscillation occurs in this feedback system at a frequency which causes the signal to the photodetector to be maximized and thus maximizes the signal applied to the acoustic transducer. The frequency at which this condition occurs is directly related to the angle between the zero order and first order diffracted waves, and also to the angle between the laser beam and the acoustic cell. The frequency of the output of the photodetector is thus uniquely determined by the angle which the laser beam makes with the acoustic cell.

It is therefore an object of this invention to provide a novel angle measurement apparatus.

A futrher object of this invention is an angle measurement apparatus utilizing a composite optical-acoustic-electronic oscillator.

Another object of this invention is an angle sensor in which the output is a frequency signal.

BRIEF DESCRIPTION OF THE DRAWINGS

FIGURE 1 is a schematic drawing, partially in block diagram form, of a preferred embodiment of this invention.

DESCRIPTION OF THE PREFERRED EMBODIMENT

Referring to the figure, a CW laser 10 such as $Nd^{3+}$ doped YAG, $Ar^+$ or He-Ne is inserted into an interferometer or optical feedback cavity consisting of reflectors 12 and 14, the reflectivity of reflector 14 being less than that of reflector 12. Flash lamps or other pumping apparatus required to energize the laser are not shown.

Inserted in the optical feedback cavity between the laser 10 and reflector 14 is an acoustic cell 16, on the bottom of which has been attached or bonded a broad bandwidth transducer 18. The acoustic cell 16 may be a solid cell, such as quartz, or a liquid cell. Teachings of an acoustic cell inserted in the laser feedback cavity are contained in copending application Ser. No. 364,395 entitled "Variable Laser-Ultrasonic Delay Line," filed May 4, 1964 by Anthony J. DeMaria and copending application Ser. No. 552,077 entitled "Laser Delay Line Using Biasing Signal," filed May 23, 1966 by Anthony J. DeMaria, both of which applications are also assigned to the same assignee.

A typical wide bandwidth transducer is CdS which is evaporated as a thin film on acoustic cell 16, and which exhibits piezoelectric effects. In addition a $LiNbO_3$ acoustic cell may be used. This medium can simultaneously serve as an acoustic medium and transducer having a wide bandwidth. Other well known transducers may be used.

The transducer 18 is actuated by an alternating electrical signal as will be explained, and an acoustic or sound wave is generated within the cell 16, beginning at the portion of the cell 16 adjacent transducer 18 and being propagated through the entire length of cell 16 at a velocity equal to the speed of sound in the cell medium. Both standing and traveling acoustic waves may be generated in the cell, but traveling waves are preferred and are produced by bonding acoustic absorber 20 to the end of the cell 16 opposite transducer 18.

Acoustic cell 16 is positioned within the optical feedback cavity of the laser so that the laser beam intercepts the acoustic wave at the Bragg angle, as will be explained.

It is well known that light is diffracted by the density variation of a medium arising from the compressions and rarefactions produced by acoustic waves. Two types of diffraction are known, normal or Raman-Nath type diffraction, and abnormal or Bragg type diffraction. In either case, diffraction will occur only if the ratio of the light beam width W to acoustic wavelength $\Lambda$ is $W/\Lambda \gg /$.

As it is well known to those skilled in the art, the light beam diffracted in the direction of sound propagation experiences an increase in frequency, while the light beam which is diffracted in the opposite direction is lowered in frequency by an equal amount.

For frequencies about a few hundred megacycles and higher in solid materials, a light beam is scattered or diffracted appreciably by an acoustic wave only if the angle between the light beam and the acoustic wave is at the Bragg angle, that is, when the angle $\phi_B$ between the light beam and the normal to the acoustic wave is specified by $$\sin \phi_B = \frac{\lambda f}{2v\eta} \qquad \text{Eq. (1)}$$

where $\lambda$ is the free space wavelength of the light beam, $f$ is the frequency of the acoustic wave, $v$ is the velocity of the acoustic wave, and $\eta$ is the index of refraction of the cell. For typical materials at an acoustic frequency $f$ of about 500 megacycles, the Bragg angle $\phi$ is on the order of one-half to one-third degree.

For Bragg type diffraction only one diffracted order is produced, and the diffracted beam varies in intensity I with angular deviations $\Delta\phi$ from the Bragg angle $\phi_B$ as $$I = Io \left\{ \frac{\sin \frac{\pi \angle \Delta\phi}{\Lambda}}{\frac{\pi \angle \Delta\phi}{\Lambda}} \right\} \qquad \text{Eq. (2)}$$

where $\angle$ is the thickness of the acoustic field through which the light beam passes, $\Lambda$ is the acoustic wavelength, $\Delta\phi$ is the maximum intensity of the diffraction order when at the Bragg angle and is given by $$Io = \frac{\pi \Delta \eta \angle}{\lambda}$$

For an acoustic frequency of 500, and an acoustic field thickness of 0.1 inch in a quartz cell 16, the intensity I is at a maximum at an angle of about 0° 40 min., and falls to zero at 0° 20 min. and 1° 0 min., with the distance between the half power points being about 30 minutes of arc. With an acoustic cell 16 having a water medium and an acoustic frequency of 50 megacycles, an angular deviation of approximately 2.5 sec. of arc on either side of the Bragg angle reduces the intensity of the diffracted order to one-half its maximum value.

While not shown in the drawings, the acoustic cell 16 is also positioned at the Brewster angle with respect to the vertical plane to minimize optical reflection losses.

Thus by positioning the acoustic cell at the Bragg angle relative to the laser beam, and generating an acoustic wave in the $10^8$ c.p.s. range within cell 16 to intercept the laser beam, the laser beam is diffracted into a zero order optical beam and a frequency shifted first order optical beam.

The zero order beam of frequency $vo$ is designated by reference numeral 22, passes through reflector 14 and through half-silvered mirror 24, and is focused by a lens 26 on photodetector 28. The first order beam, designated by reference numeral 30, is deflected from cell 16 at an angle $Z\phi$ from the zero order beam, and is frequency shifted by a frequency $f$, the frequency of the acoustic wave. A lens 23 is used to focus this beam on mirror 32.

A fully reflecting mirror 32 is positioned to intercept first order beam 30 and reflect it to the silvered surface of mirror 24 through lens 25, where the beam is in turn focused through lens 26 onto photodetector 28.

Thus the two optical beams 22 and 30, of frequencies $vo$ and $vo+f$, are focused simultaneously on photodetector 28. The photodetector will superheterodyne the two optical frequencies and produce at its output an electrical signal of frequency $f$, thereby reproducing the electrical input signal which appeared at transducer 18.

The structure so far described is similar to the laser delay line described in copending application Ser. No. 552,077 referred to previously. However, it has been discovered that by feeding the output of photodetector 28 back to actuate transducer 18, this structure has considerable value as an angle sensing device. To accomplish this, the output from photodetector 28 is fed to a power amplifier 34, and the amplifier output is then fed through an output resistor 36 to the input of transducer 18 to actuate the transducer and generate an acoustic wave of frequency $f$ in cell 16.

The actuation of the transducer by the output signal from the photodetector completes the loop of a feedback system, and as in all feedback systems oscillation occurs under conditions which will maximize the input signal to the transducer. The frequency for which this condition occurs is selected by the Bragg angle $\phi$. Thus the acoustic frequency can be selected by varying the angle $\phi$ which the laser beam makes with the plane of the acoustic medium. By monitoring the frequency $f$ of the generated acoustic wave, as by connecting a frequency sensor across resistor 36, the angle $\phi$ can be measured as accurately as frequency can be measured.

Equation 1 can be rewritten $$f = \frac{2v\eta}{\lambda} \sin \phi_B$$

and it is apparent that the frequency $f$ will vary directly with the Bragg angle, $\phi_B$. Thus a small change in the Bragg angle $\phi_B$ will cause a frequency shift which can be directly translated into an angle if all other parameters remain constant.

Oscillation is initiated by means of background noise caused by scattered light from the laser as it traverses the acoustic cell. Because of thermal agitation, any homogeneous medium undergoes small perpetual fluctuations of density, known as Brillouin scattering. These density fluctuations can be regarded as caused by thermal elastic waves. The medium can then be regarded as crossed in every direction by elastic waves of all but finite frequencies. As the laser beam traverses the acoustic cell, some scattering will occur as a result of photon scattering with thermal phonons, and this scattering is sufficient to initiate oscillation.

The mirror 32 need not be readjusted for each angle to be measured since a range of angles may be measured for any given fixed mirror position. The range is determined by the detailed design of the system. The lens 26 is used to bring the two beams to a common point on a photodetector 28, and this focusing technique reduces the plane-parallel phase-front requirements for obtaining optical superheterodyning. The lens 26 may be omitted from the system, but the range of angles which can be measured without adjusting mirror 32 is reduced.

It should be apparent to one skilled in the art that the acoustic cell need not be positioned within the laser's optical feedback cavity, but may be positioned outside the feedback cavity in the path of the laser beam. There are many practical situations in which the outside position is preferred. The position of the acoustic cell inside the cavity will inherently produce greater sensitivity, but depending on other conditions may cause so much loss that the laser will not oscillate.

A curved mirror 32 will increase the angular range over which this apparatus can be used for a fixed position of the mirror with respect to the acoustic medium.

Frequencies can be measured with an accuracy of better than one part in $10^{12}$ with commercially available instruments. The limiting parameter of this apparatus for accuracy is determined by the velocity of sound variations as a function of temperature. In fused quartz the sound velocity varies by approximately 108 parts per $10^6$ per degree centigrade. If temperature is held constant to within 0.01° C., this apparatus will measure the angle $\phi$ accurately to one part in $10^6$.

Although this invention has been shown and described with respect to the preferred embodiment thereof, it should be understood by those skilled in the art that the foregoing and various other changes and omissions in the form and detail thereof may be made without departing from the scope of the invention, which is to be limited and defined only as set forth in the following claims.

Having thus described a preferred embodiment of my invention what I claim as new and desire to secure by Letters Patent of the United States is:

1. Angle measuring apparatus comprising:
   means for generating a laser beam including a laser medium having a pair of end reflectors to form a feedback cavity,
   an acoustic medium positioned in the path of said laser beam, the plane of said acoustic medium being approximately at the Bragg angle relative to said laser beam,
   means for generating an acoustic wave within said acoustic medium, said acoustic wave intersecting said laser beam and diffracting said laser beam,
   means for combining portions of the diffracted beam,
   means responsive to said laser beam for generating an electrical signal of a frequency proportional to the angle between said laser beam and said acoustic medium,
   and means for feeding said electrical signal to said acoustic wave generating means.

2. Angle measuring apparatus as in claim 1 in which one of said reflectors is spaced from said laser medium, said acoustic medium being spaced in the feedback cavity between said laser medium and said spaced reflector.

3. Angle measuring apparatus as in claim 1 in which said electrical signal is an alternating signal having a signal indicative of the frequency of said acoustic wave.

4. Angle measuring apparatus as in claim 3 in which said laser beam is diffracted into a zero order optical beam and first order optical beam, said first order beam being frequency shifted by an amount equal to said acoustic wave frequency,
   and in which said means for generating an electrical signal is a photodetector,
   and further including means for directing both said zero order and first order optical beams to simultaneously converge on said photodetector.

5. Angle measuring apparatus as in claim 4 and including a first fully reflecting mirror and a second partially reflecting-partially transmitting mirror,
   means positioning said first mirror in the path of said first order beam to reflect said first order beam to the reflecting portion of said second mirror,
   and means positioning said second mirror in the path of said zero order beam, said second mirror transmitting said zero order beam therethrough and reflecting said first order beam to direct both said zero order and first order beams on said photodetector.

6. Angle measuring apparatus as in claim 5 and including a lens positioned between said second mirror and said photodetector to focus both said zero order and first order beams on said photodetector.

7. Angle measuring apparatus as in claim 6 and including a transducer connected to one end of said acoustic medium to generate said acoustic wave in said acoustic medium,
   an amplifier connected to said photodetector for amplifying said electrical signal,
   and means connecting said amplified electrical signal to said transducer to actuate said transducer.

References Cited

UNITED STATES PATENTS 3,297,876   1/1967   DeMaria.
3,373,380   3/1968   Adler.

RONALD L. WIBERT, Primary Examiner

T. MAJOR, Assistant Examiner

U.S. Cl. X.R.
350—161, 162